United States Patent
Koyama et al.

(10) Patent No.: US 7,957,109 B2
(45) Date of Patent: Jun. 7, 2011

(54) MAGNETIC HEAD OF MAGNETORESISTANCE EFFECT TYPE WITH HIGH RESISTANCE TO EXTERNAL STRESS

(75) Inventors: Naoki Koyama, Tokyo (JP); Koichi Nishioka, Kanagawa (JP); Kouji Okazaki, Kanagawa (JP); Shuichi Kojima, Kanagawa (JP); Azusa Hori, Kanagawa (JP); Satoshi Shigematsu, Kanagawa (JP); Yukimasa Okada, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 938 days.

(21) Appl. No.: 11/900,533

(22) Filed: Sep. 11, 2007

(65) Prior Publication Data

US 2008/0074803 A1 Mar. 27, 2008

(30) Foreign Application Priority Data

Sep. 11, 2006 (JP) .................................. 2006-245621

(51) Int. Cl.
*G11B 5/39* (2006.01)
*G11B 5/127* (2006.01)

(52) U.S. Cl. .................................................... 360/324.2

(58) Field of Classification Search ........ 360/324–324.2
See application file for complete search history.

(56) References Cited

U.S. PATENT DOCUMENTS

| 5,465,185 | A | 11/1995 | Heim et al. |
| 5,701,223 | A | 12/1997 | Fontana, Jr. et al. |
| 6,221,172 | B1 | 4/2001 | Saito et al. |
| 6,781,799 | B2 * | 8/2004 | Seyama et al. ............ 360/324.11 |
| 7,126,797 | B2 | 10/2006 | Hasegawa et al. |
| 7,381,480 | B2 * | 6/2008 | Nakamura et al. ......... 428/811.5 |
| 7,593,196 | B2 * | 9/2009 | Gill .......................... 360/324.11 |
| 2003/0128481 | A1 * | 7/2003 | Seyama et al. ............. 360/324.1 |
| 2005/0237674 | A1 | 10/2005 | Shimazawa et al. |
| 2006/0002040 | A1 | 1/2006 | Nishioka et al. |
| 2006/0012927 | A1 | 1/2006 | Seino et al. |
| 2006/0056115 | A1 * | 3/2006 | Djayaprawira et al. .... 360/324.2 |
| 2006/0119989 | A1 * | 6/2006 | Seyama et al. ............. 360/324.1 |

(Continued)

FOREIGN PATENT DOCUMENTS

JP 07-169026 7/1995

(Continued)

OTHER PUBLICATIONS

English-machine translation of JP 2006-202784 A,Shimazawa et al, Aug. 3, 2006.*

*Primary Examiner* — William J Klimowicz
(74) *Attorney, Agent, or Firm* — Zilka-Kotab, PC (57) ABSTRACT

A tunnel magnetoresistance effect magnetic head having between magnetic shield layers, an antiferromagnetic layer, a pinned layer which has the direction of magnetization pinned by exchange coupling with the antiferromagnetic layer, an insulating layer, and a free layer whose direction of magnetization rotates relatively to external magnetic fields, wherein the antiferromagnetic layer is of an antiferromagnetic substance composed mainly of IrMn, the pinned layer is made up of a first pinned layer of CoFe alloy in contact with the antiferromagnetic layer and a second pinned layer of CoFeB alloy which is antiferromagnetically coupled with the first pinned layer, and the first and second pinned layers have the amount of magnetization such that the difference M1−M2 is in the range of 0<M2−M1<0.5 (nm·T) and also have the magnetostriction constants such that the difference $|\lambda 1 - \lambda 2|$ is no larger than $5.0 \times 10^{-6}$.

5 Claims, 7 Drawing Sheets

U.S. PATENT DOCUMENTS

2006/0187592 A1 * 8/2006 Noma ............... 360/324.12
2006/0193089 A1 * 8/2006 Li et al. ............. 360/324.11

FOREIGN PATENT DOCUMENTS

| | | |
|---|---|---|
| JP | 09-016920 | 1/1997 |
| JP | 10-302227 | 11/1998 |
| JP | 2000-040209 | 2/2000 |
| JP | 2000-113418 | 4/2000 |
| JP | 2004-259914 | 9/2004 |
| JP | 2005-310265 | 11/2005 |
| JP | 2006-018862 | 1/2006 |
| JP | 2006-032522 | 2/2006 |
| JP | 2006202784 A * | 8/2006 |

* cited by examiner

MAGNETIC HEAD OF MAGNETORESISTANCE EFFECT TYPE WITH HIGH RESISTANCE TO EXTERNAL STRESS

CROSS-REFERENCE TO RELATED APPLICATION

The instant nonprovisional patent application claims priority to Japanese Patent Application No. 2006-245621 filed Sep. 11, 2006 and which is incorporated by reference in its entirety herein for all purposes.

BACKGROUND OF THE INVENTION

The recent demand for a magnetic recording apparatus with higher performance and lower price than before is actively promoting the development of new technologies to improve the areal recording density. The magnetic head along this line is required to have a narrower track width (for both read and write heads) and a smaller read gap than before. This is true also for the GMR (giant magnetoresistive) element as the read element, which needs a smaller size and a thinner film thickness. A GMR element consists basically of a free layer and a pinned layer (both of which are magnetic thin films) and a thin non-magnetic conductive layer held between them. It detects magnetic fields by utilizing the phenomenon that the conductive layer varies in resistance in response to the angle of magnetization of the two magnetic layers. Recently, the TMR (tunneling magnetoresistive) element has come into practical use, which has an insulating film in place of the non-magnetic conductive film and detects magnetic fields by utilizing the phenomenon that the tunnel current flowing across the two magnetic layers varies in response to the angle of magnetization in them.

The GMR element or the TMR element mentioned above has a magnetic layer called a pinned layer. This magnetic layer is pinned by the magnetic field arising from exchange coupling to an antiferromagnetic layer, so that its magnetization is not affected by external signal magnetic fields. The pinned magnetization generates magnetic charges to affect the movement of magnetization in the free layer. This problem is addressed by dividing the pinned layer into two magnetic layers, which are antiferromagnetically coupled to each other through a thin non-magnetic layer so that they have mutually antiparallel magnetization. This technology is disclosed in Japanese Patent Publication No. 7-169026 ("Patent Document 1"). It discloses that the magnetization of the pinned layer, which adversely affects the magnetization of the free layer, is cancelled, and this leads to improvement in the head characteristics. There has been disclosed in Japanese Patent Publication No. 9-16920 ("Patent Document 2") a new technology to reduce to nearly zero the difference in magnetization between the two pinned layers which are anti-ferromagnetically coupled to each other. This technology helps increase the coupled magnetic field because the magnetic field due to coupling to the anti-ferromagnetic layer is inversely proportional to the magnetization of the pinned layer. Moreover, there is Japanese Patent Publication No. 2000-40209 ("Patent Document 3") which discloses an idea of making the film thickness slightly different in view of the fact that the ferri-state does not easily occur when the film thickness is the same.

Japanese Patent Publication No. 10-302227 ("Patent Document 4") discloses a technology of stabilizing the orientation of magnetization in the pinned layer by so adjusting the magnetostriction constant as to control the anisotropy of the pinned layer by means of the magnetoelastic effect. Japanese Patent Publication No. 2000-113418 ("Patent Documents 5") and Japanese Patent Publication No. 2004-259914 ("Patent Document 6") disclose a technology of stabilizing magnetization by making the magnetostriction constant positive in each layer for the automatic pinning structure (which is so designed as to fix magnetization only by the pinned layer without antiferromagnetic layer). Japanese Patent Publication No. 2005-310265 ("Patent Document 7") discloses a dual spin valve head having two sets of stacked pinned layers in which each pinned layer has an adequate thickness and magnetostriction constant so that the pinned layer is magnetization free from flux reversal when the head slider is suffered mechanical damage through lapping process or contact with the recording medium. Japanese Patent Publication No. 2006-032522 ("Patent Document 8") discloses an adequate composition of CoFe pinned layer to increase a coupling energy with IrMn layer for the head of so-called top spin value type in which an antiferromagnetic layer is stacked after the pinned layer stacking or the head of dual spin valve type in which two upper and lower pinned layers are stacked. Japanese Patent Publication No. 2006-018862 ("Patent Document 9") discloses an adequate composition of the pinned layer for a large coupling energy between the pinned layer and the PtMn antiferromagnetic layer.

Moreover, the "Study on Pinned Layer of GMR Head for Its Magnetization Behavior and Its Improvement", Japan Association of Applied Magnetism, K. Nishioka et al., Feb. 15, 2005; pp. 49-58 ("Non-Patent Document 1") discloses a means for making the pinned layer resistant to electric discharges or mechanical shocks by allowing two pinned layers to have large anisotropic energies with a minimum of their difference.

None of the above-mentioned Patent Documents and Non-Patent Document disclose any concrete, comprehensive technologies for the magnetic head which produces a high output, with the pinned layer therein magnetizing without being affected by external disturbance, even when its magnetoresistive element is miniaturized to such an extent that both the track width and the height are smaller than 100 nm. In fact, the size of the magnetoresistive element is decreasing more and more (with the track width and the height becoming smaller than 100 nm) to meet requirement for improvement in recording density. The element with smaller dimensions has a decreased volume, and this results in a decreased energy accumulated for the pinning of magnetization of the pinned layer. On the other hand, the higher recording density leads to a decreased flying height and increased chances of the magnetic head coming into contact with the surface of the recording medium, with the latter causing the magnetization of the pinned layer to rotate. In addition, the magnetization of the pinned layer is subject to rotation by electric discharges and mechanical stress which are encountered during fabrication of the magnetic head.

One way to stabilize the magnetization of the pinned layer is to increase the accumulated energy for the magnetization of the pinned layer so as to reduce the effect of external disturbance. Moreover, the element should be so constructed as to be restored even though the magnetization of the pinned layer is changed by shocks.

BRIEF SUMMARY OF THE INVENTION

An object in accordance with embodiments of the present invention is to prevent the pinned layer from suffering magnetization reversal by external stress in the magnetic head of magnetoresistance effect type which has a synthetic ferri-magnetic pinned layer structure with an antiferromagnetic layer of IrMnCr. According to the particular embodiment disclosed in FIG. 1 of the present invention, the read element 20 of the magnetoresistive head is made up of the antiferromagnetic layer 1, the first pinned layer 2, the antiferromagnetically coupled layer 4, the second pinned layer 5, and the free layer 7, which are stacked one over another. The first and second pinned layers 2 and 5 have a composition of $Co_{75}Fe_{25}$ and $Co_{95}Fe_5$, respectively, and a thickness of 18 Å (3.5 nm·T) and 21 Å (3.9 nm·T), respectively, so as to reduce the difference in anisotropic energy between the first pinned layer 2 in contact with the antiferromagnetic layer 1 and the second pinned layer 5 in contact with the nonmagnetic conductive layer 6. In this way it is possible to reduce the difference $|\lambda 1-\lambda 2|$ in magnetostriction constant between the first and second pinned layers 2 and 5 below $5.0 \times 10^{-6}$. Thus it is possible to protect the pinned layer from external stress and magnetic fields which rotate the direction of magnetization.

DETAILED DESCRIPTION OF THE INVENTION

Embodiments in accordance with the present invention relate to a magnetic head to be used for a magnetic recording apparatus and, more particularly, to a structure of a read head of magnetoresistance effect type.

It is an object of embodiments of the present invention to provide a read element which is constructed such that its pinned layer changes little in magnetization by external stress or any change in magnetization is easily restored.

For solution of problems involved in prior art technologies, embodiments of the present invention provide a magnetoresistive head having a synthetic ferri-magnetic pinned layer consisting of a first pinned layer and a second pinned layer which are composed of specific materials for adequate magnetic properties. The magnetoresistive head has an antiferromagnetic layer composed mainly of IrMn and the first pinned layer has an adequate composition, so that there exists a large exchange coupling energy between the first pinned layer and the antiferromagnetic layer and the first pinned layer keeps its magnetization without being affected easily by external energy. The first and second pinned layers are designed such that there exists an adequate difference between the amounts of their magnetization and their anisotropic energy is adequate. These characteristic properties permit the pinned layer to be restored easily even after their change in magnetization by external magnetic stress. Therefore, the magnetoresistive head (for reading) is suitable for high-density recording and has good resistance to external stress.

To be concrete, the first pinned layer (adjacent to the antiferromagnetic layer) is composed of $Co_{100-x}Fe_x$ (where $20 \leq x \leq 30$ at %) and the second pinned layer (adjacent to the non-magnetic conductive layer) is composed of $Co_{100-x}Fe_x$ (where $0 \leq x \leq 10$ at %), so that there exists a high exchange coupling energy with the antiferromagnetic layer. Moreover, the first and second pinned layers are designed such that the difference between the amounts of their magnetization is 0 to 0.5 nm·T and the difference between their magnetostriction constants is no larger than $5.0 \times 10^{-6}$.

Embodiments of the present invention may be modified such that the first pinned layer consists of two layers (layer A and layer B), each composed of CoFe. Layer A (adjacent to the antiferromagnetic layer) has a composition of $Co_{100-x}Fe_x$ (where $20 \leq x \leq 30$ at %) and layer B (adjacent to the Ru film) has a composition of $Co_{100-x}Fe_x$ (where $0 \leq x \leq 10$ at %). Layer A and layer B produce adequate magnetic properties depending on their ratio.

The effect of the foregoing head structure is that the difference $(\lambda 1-\lambda 2)$ between the magnetostriction constants can be kept below $5.0 \times 10^{-6}$ without loss in exchange coupling energy between the first pinned layer and the antiferromagnetic layer and the pinned layer is protected from rotation by external stress and magnetic field.

As mentioned above, there is a slight positive difference (instead of exact zero) in the amount of magnetization between the first pinned layer and the second pinned layer. The reason for this is that the first and second pinned layers, which are stacked in the thickness direction, each experience slightly different stresses and also experience slightly different magnetic anisotropy due to their different compositions. If the difference in the amount of magnetization between the first and second pinned layers is established without consideration of the difference in magnetic anisotropy, the pinned layer suffers magnetization reversal even when the pinned layer only slightly changes in the amount of magnetization. This means that there is little or no margin for difference in the amount of magnetization of the pinned layers. Therefore, the desired difference in the amount of magnetization of the pinned layers should be 0 to 0.5 nm·T.

Embodiments of the present invention provide a read element which is constructed such that the pinned layer changes little in magnetization by external stress and is easily restored even when it suffers changes.

Figure 9:
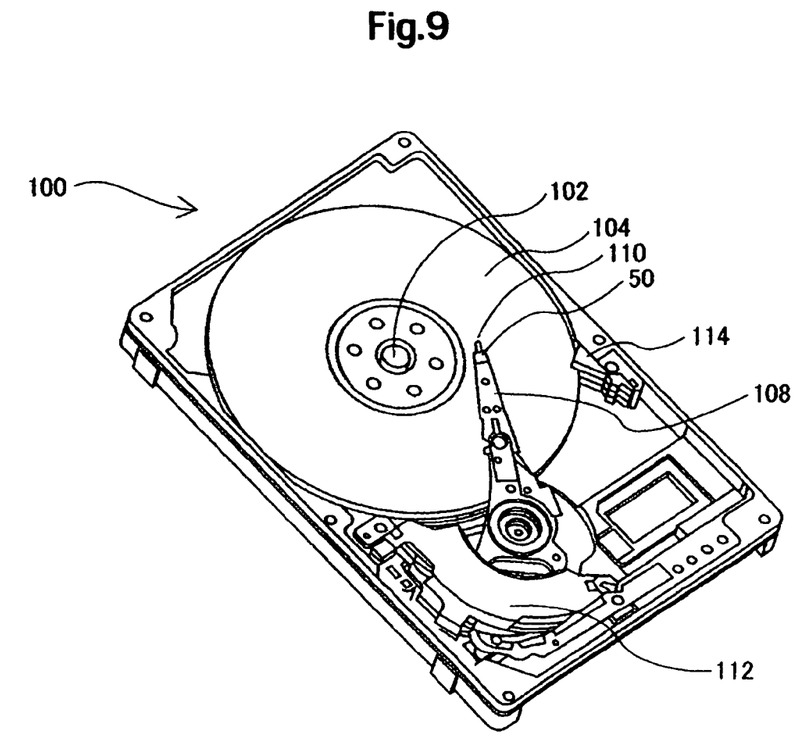
FIG. 9 is a top view showing the entire structure of the magnetic disk apparatus according to embodiments of the present invention.
Figure 10:
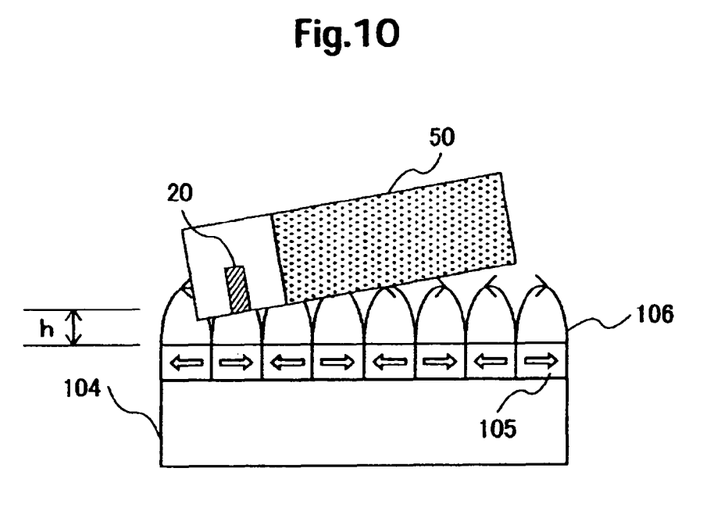
FIG. 10 is a side view showing how the magnetic head flies over the magnetic disk.

FIGS. 9 and 10 schematically show the structure of the magnetic disk relating to embodiments of the present invention. FIG. 9 is a top view showing the entire structure of the magnetic disk apparatus, and FIG. 10 is a side view showing how the magnetic head flies over the magnetic disk. The magnetic disk apparatus 100 is comprised of the magnetic disk 104 (which is turned by the spindle motor 102), the magnetic head 50 (which is equipped with at least the read element 20), the suspension 108 (which supports the magnetic head 50), the actuator 112 with a voice coil motor (which swings the suspension 108), and the ramp mechanism 114 (which allows the magnetic head 50 to retreat). The magnetic head 50 is so supported by the suspension 108 as to fly over the rotating magnetic disk for writing and reading information to and from the magnetic disk. When the writing or reading operation is completed or when the magnetic disk apparatus stops, the magnetic head 50 is brought to the ramp mechanism 114 by the actuator 112, with the lift tab 110 (at the forward end of the suspension) resting thereon. With the flying height (h) reduced to about 10 nm (or even less than 10 nm) recently, there are increasing chances of the magnetic head 50 coming into contact with the surface of the magnetic disk 104.

The magnetic disk 104 holds the magnetic information 105 which consists of recording units each representing one bit. The recording units produce the leakage fluxes 106 which are sensed (and recognized as signals) by the read element 20 or a magnetoresistive element such as GMR element and TMR element. Incidentally, the magnetic head 50 mentioned above consists only of the read element 20 of magnetoresistance effect type; however, it may be a compound head in which the read element 20 is juxtaposed to a recording element of inductive type.

Example 1

Figure 1:
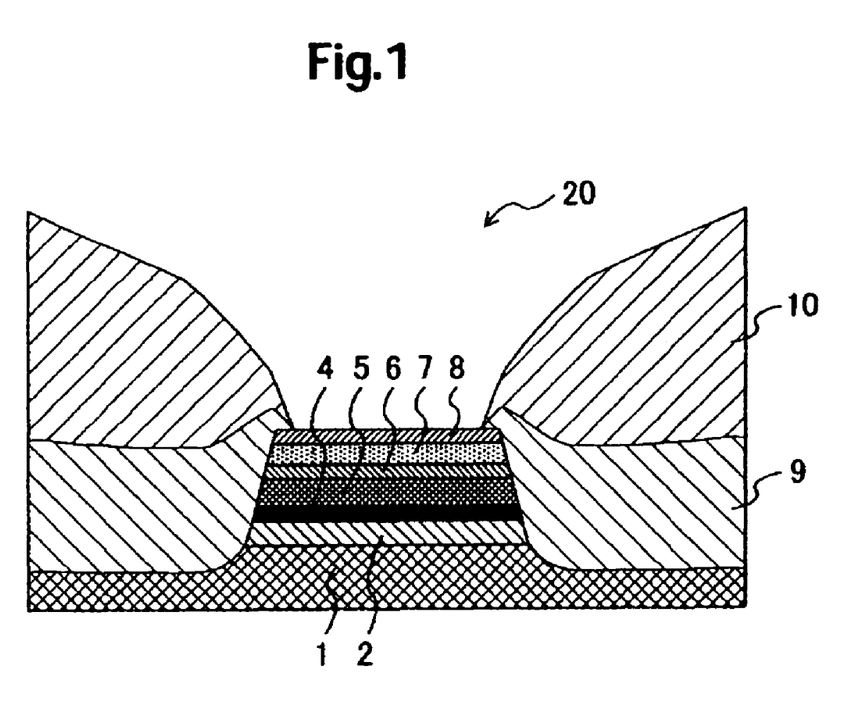
FIG. 1 is a top view (facing the recording medium) of the read element of the magnetoresistive head pertaining to Example 1.

FIG. 1 is a top view (facing the recording medium) of the read element of the magnetic head (of magnetoresistance effect type) pertaining to Example 1. This magnetic head is a GMR head and the element 20 is composed of the following layers which are stacked one over another.

The antiferromagnetic layer 1 (which is an IrMnCr film, 6 nm in thickness), the first pinned layer 2, the antiferromagnetic coupling layer 4, the second pinned layer 5, the nonmagnetic conductive layer 6, the free layer 7, and the protective layer 8. Incidentally, the antiferromagnetic layer 1 (or the IrMnCr film) may be formed from any antiferromagnetic substance composed mainly of IrMn.

The first and second pinned layers 2 and 5 are of CoFe alloy. They have compositions represented by $Co_{75}Fe_{25}$ (or CoFe25%) and $Co_{95}Fe_5$ (or CoFe5%), respectively. Their thickness is 18 Å (with magnetization of 3.5 nm·T) and 21 Å (with magnetization of 3.9 nm·T). The antiferromagnetic coupling layer 4 is a Ru film, 4.5 Å in thickness. The nonmagnetic conductive layer 6 is a Cu film, 18 Å in thickness. The free layer 7 is composed of two layers, the first one adjacent to the Cu film being a CoFe film, 10 Å in thickness, and the second one adjacent to the protective layer being a NiFe film, 15 Å in thickness. The protective layer 8 is a Ta film, 20 nm in thickness.

The multilayered element 20 mentioned above is made into the read head for the magnetic disk apparatus by stacking it on an insulating layer backed by a lower magnetic shield layer (which are not shown in FIG. 1). Subsequently, the resulting element has its rear end and lateral sides finished by etching. (The rear end is behind the paper and the lateral ends correspond to the track width.) The thus finished element is covered with the permanent magnet layer 9 of CoCrPt (to control magnetic domains) and the Rh film 10, 100 nm in thickness. Delineation etching of the multilayered element 20 is stopped at the middle of the antiferromagnetic layer 1 to adjust the height position of the permanent layer 9 to the free layer 7. Finally, the top layer is coated sequentially with an insulating layer and an upper magnetic shield layer (not shown). The element 20 held between two magnetic shield layers (each separated by an insulating layer) functions as the read head 50 of magnetoresistance effect type.

Figure 2:
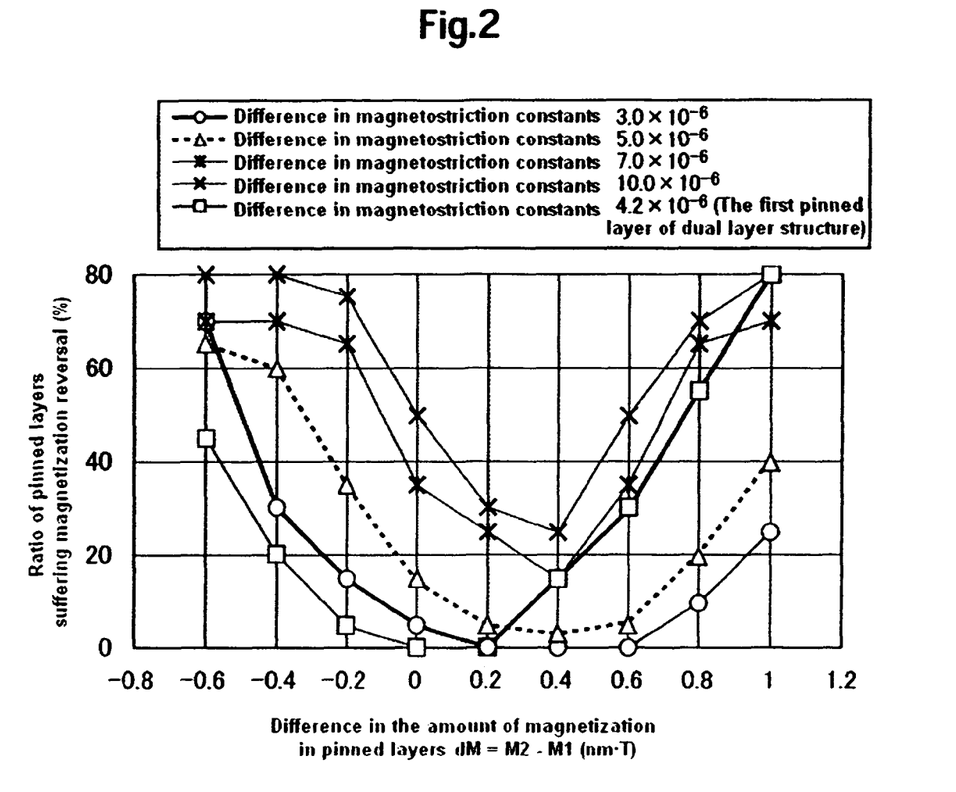
FIG. 2 is a diagram showing the relation among the ratio of pinned layers suffering magnetization reversal, the difference in the amount of magnetization between pinned layers, and the difference in the magnetostriction constants between pinned layers.

FIG. 2 shows how the magnetoresistive head 50 mentioned above is stable to external magnetic fields. The stability is evaluated by observing the direction of magnetization of the pinned layers after application of an external magnetic field (±10 kOe:±800 kA/m) in the direction of the height of the element 20 shown in FIG. 1 (or the direction perpendicular to the paper). The axis of ordinate represents the stability (or resistance) to external magnetic fields in terms of the ratio (%) of the number of heads with magnetization reversal to the number of the tested heads. Magnetization reversal is judged by observing whether or not the direction of magnetization is reversed in the first and second pinned layers (2 and 5) when an external magnetic field is applied to the magnetoresistive head 50 and then it is removed. Stability (or resistance) to external magnetic fields is the ability of the first and second pinned layers to restore their magnetization when they receive an external magnetic field (so that the direction of their magnetization orients to the direction of the applied magnetic field), which is subsequently diminished to zero. Without such stability, the direction of their magnetization is reversed after the external magnetic field has been diminished. The actual magnetic head is subject to impact against projections (foreign matter) on the recording medium during its operation in the magnetic recording apparatus. It is assumed that the element receives a compressive stress upon impact, so that the magnetization of the pinned layer is reversed by the magnetoelastic effect and the reversed magnetization is restored later. Magnetization similar to this phenomenon can be produced by application of an external magnetic field. Therefore, the evaluation as mentioned above provides an index for resistance to external stress. The axis of abscissa in FIG. 2 represents the difference (dM) betweens the amount of magnetization (M1) of the first pinned layer 2 and the amount of magnetization (M2) of the second pinned layer 5. The difference (either positive or negative) in the amount of magnetization (which is equal to M2 minus M1) is proportional to the ratio of magnetization reversal. The magnetic head shown in FIG. 1 is denoted by the symbol ○ in FIG. 2. It is stable at dM=0.4 nm·T, with the ratio of magnetic reversal being 0%. It remains stable even when dM fluctuates between 0.4±0.2 nm·T. This suggests that the pinned layer has a sufficient margin for the difference in the amount of magnetization.

As the difference in magnetostriction constant varies between the first pinned layer 2 and the second pinned layer 5, the relation between the ordinate and the abscissa varies accordingly as shown in FIG. 2. The symbols "○", "Δ", "*", and "x" represent respectively those samples in which the difference in magnetostriction constants is $3.0 \times 10^{-6}$, $5.0 \times 10^{-6}$, $7.0 \times 10^{-6}$, and $10.0 \times 10^{-6}$. As mentioned later, the difference in magnetostriction constants can be varied by adequately selecting the composition of the second pinned layer 5. It is noted from FIG. 2 that as the difference in magnetostriction constants increases, the ratio of pinned layers with magnetization reversal does not decrease to zero even though the value of dM varies. This implies low resistance to external magnetic fields. In the case of those samples in which the difference in magnetostriction constants is $5.0 \times 10^{-6}$, the ratio of pinned layers with magnetization reversal is zero even though their dM has a slightly lower margin. The foregoing suggests that the pinned layers vary in resistance to external magnetic fields depending on the difference in their magnetostriction constants.

Figure 3:
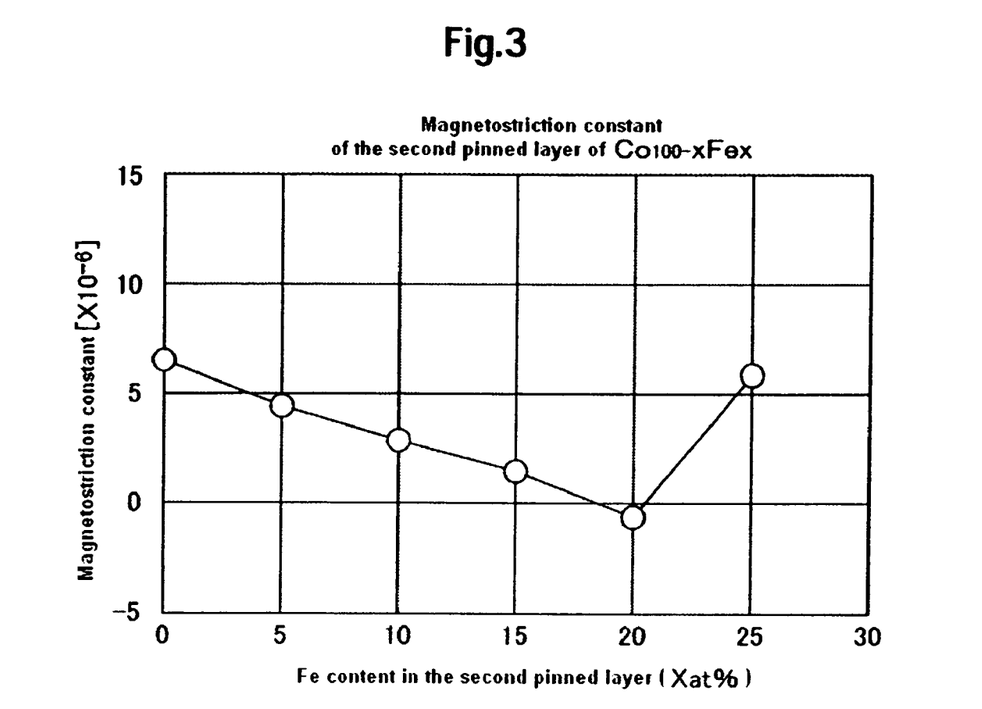
FIG. 3 is a diagram showing the relation between the Fe content in the second pinned layer and the magnetostriction constant of the second pinned layer.
Figure 4:
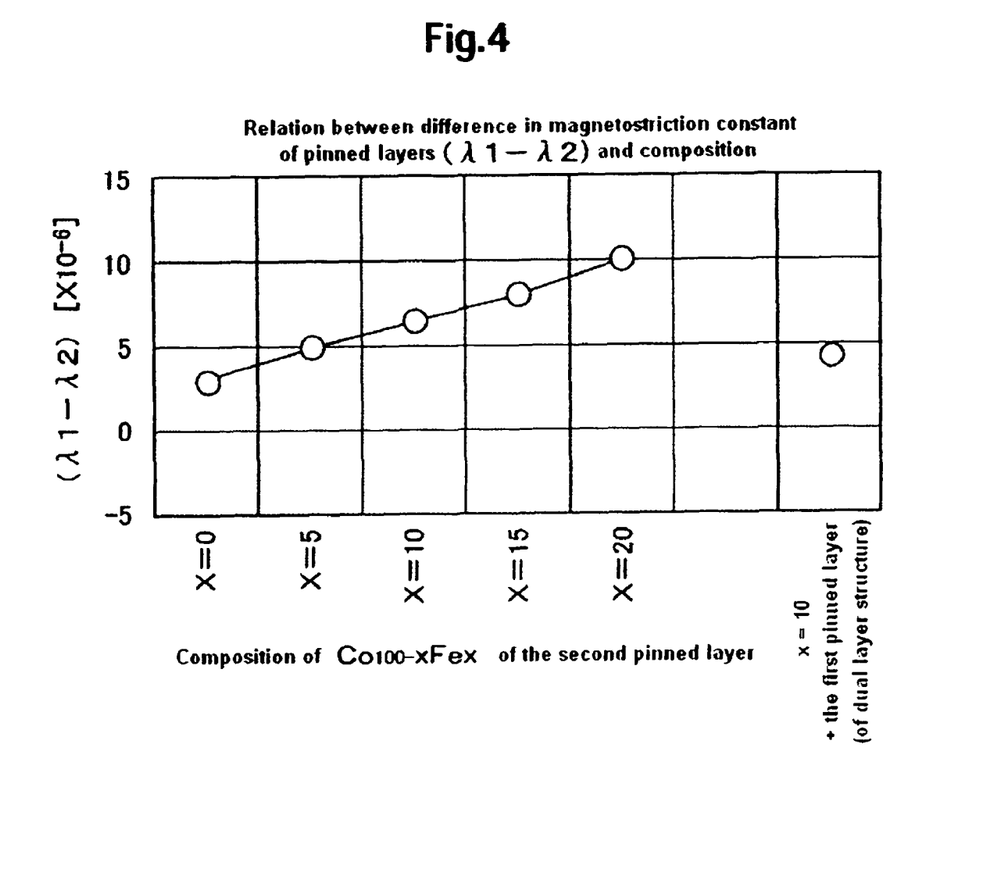
FIG. 4 is a diagram showing the relation between the Fe content in the second pinned layer and the difference in the magnetostriction constant between the first and second pinned layers.

In the meantime, the adjustment of magnetostriction constants, which has been mentioned above, was accomplished by properly selecting the Fe content in the second pinned layer 5. It was found that increasing the Fe content in the second pinned layer 5 from 0% to 20% causes the magnetostriction constant of the second pinned layer 5 to decrease from $6.5 \times 10^{-6}$ to nearly zero, as shown in FIG. 3. It was also found that increasing the Fe content in the first pinned layer 2 to 25% causes the magnetostriction constant of the first pinned layer 2 to increase to $9.5 \times 10^{-6}$. (This result is not illustrated.) Although the magnetostriction constant depends primarily on the Fe content, it may vary depending on the underlying film (particularly in the case of thin film) even though the Fe content is the same. Therefore, increasing the Fe content in the second pinned layer 5 from 0% to 20% while keeping the Fe content in the first pinned layer 2 at 25% causes the difference in magnetostriction constants ($\lambda 1 - \lambda 2$) to change from $3.0 \times 10^{-6}$ to $10.0 \times 10^{-6}$, as shown in FIG. 4. It is noted from FIG. 4 that for the difference in magnetostriction constants to be small, the Fe content in the second pinned layer 5 should be lower than 10%, preferably lower than 5%. In this way it is possible to select the difference in magnetostriction constants which is desirable for the low ratio of magnetization reversal in the pinned layers, as shown in FIG. 2.

It is reasoned as follows that the pinned layers undergo magnetization reversal in different ratios on application of external magnetic fields depending on the value of dM and the difference in magnetostriction constants. Magnetization reversal in the pinned layers is a phenomenon that magnetization in the first pinned layer 2 (which is exchange-coupled with the antiferromagnetic layer 1) rotates in the opposite direction when an external magnetic field is applied until saturation and then reduced. Since the second pinned layer 5 has a larger anisotropic energy than the first pinned layer 2, magnetization in the first pinned layer 2 begins to rotate in the opposite direction as the external magnetic field is reduced. With the anisotropic energy depending on the film thickness and the amount of magnetization, magnetization in the second pinned layer 5 predominates when dM is larger than a specific value for the minimum ratio of magnetization reversal and hence magnetization in the first pinned layer 2 rotates in the opposite direction. On the other hand, magnetization in the first pinned layer 2 predominates when dM is smaller than a specific value for the minimum ratio of magnetization reversal and hence magnetization in the second pinned layer 5 rotates in the opposite direction. The difference in magnetostriction constants ($\lambda 1 - \lambda 2$) between the pinned layers is a parameter which changes the magnitude of the anisotropic magnetic field through the magnetoelastic effect; therefore, it changes the anisotropic magnetic field and also causes the ratio of magnetization reversal to change depending on the value of dM. Moreover, each magnetic head receives local stresses from the electrode layer 10 and the permanent magnetic layer 9 after fabrication of its air bearing surface. Moreover, it also receives stresses during its lapping process. Therefore, individual magnetic heads may possibly have different residual strains. If there exist an unevenly distributed stress, the large difference in magnetostriction constants causes the anisotropic magnetic fields to distribute widely due to the magnetoelastic effect. Consequently, there is a possibility that the ratio of magnetization reversal does not decrease to zero even at a specific value of dM at which the ratio of magnetization reversal is minimal. The foregoing is a probable reason for the fact that the ratio of magnetization reversal does not decrease to zero despite the large difference in magnetostriction constants.

As mentioned above, Example 1 provides a magnetic head having pinned layers which retain extremely stable magnetization (with the direction of magnetization being hardly reversed). Moreover, the magnetic head is constructed such that the two pinned layers are less liable to magnetization reversal even when they differ from each other in the amount of magnetization. The magnetic head permits the two pinned layers to keep an adequate difference in the amount of magnetization and to keep their anisotropic energy at a proper level, so that they are easily restored even when the direction of magnetization changes.

Example 2

Figure 5:
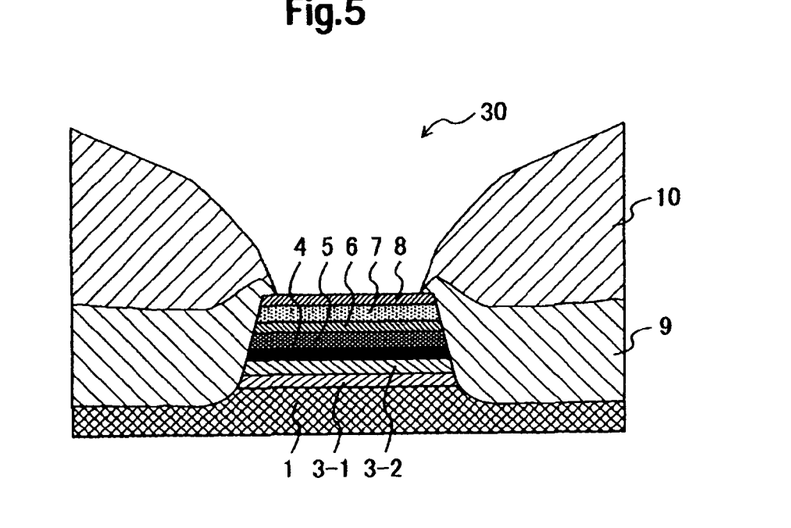
FIG. 5 a top view (facing the recording medium) of the read element of the magnetoresistive head pertaining to Example 2.

FIG. 5 is a top view (facing the recording medium) of the read element of the magnetic head (of magnetoresistance effect type) pertaining to Example 2. This magnetic head has the element 20 composed of the following layers which are stacked one over another.

Figure 6:
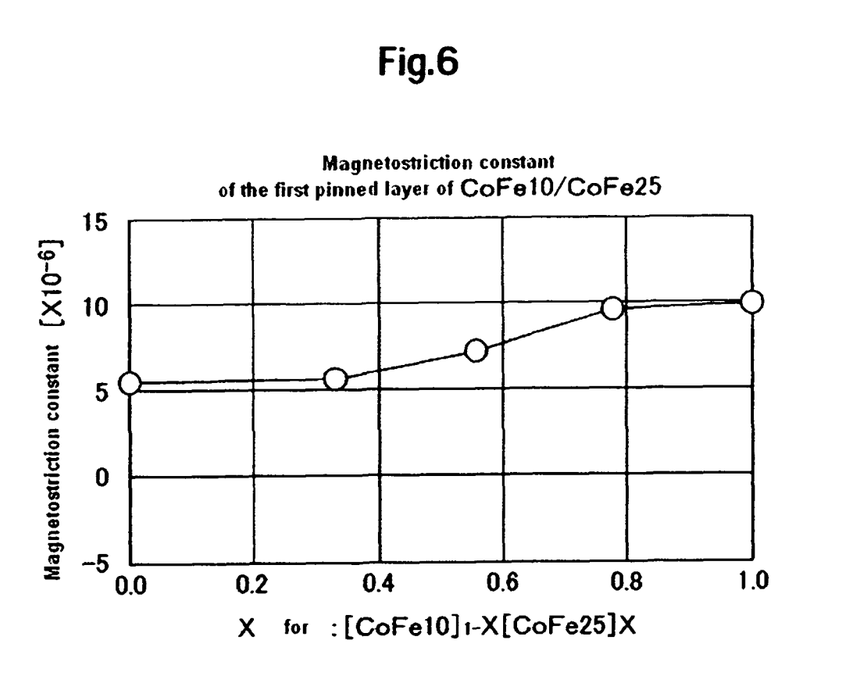
FIG. 6 is a diagram showing how the first pinned layer of dual-layer structure varies in the magnetostriction constant depending on the ratio of the constituents of the two layers.

The antiferromagnetic layer 1 (which is an IrMnCr film, 6 nm in thickness), the first pinned layer composed of layer A (3-1) and layer B (3-2), the antiferromagnetic coupling layer 4, the second pinned layer 5, the non-magnetic conductive layer 6, the free layer 7, and the protective layer 8. Incidentally, the antiferromagnetic layer 1 (or the IrMnCr film) may be formed from any antiferromagnetic substance composed mainly of IrMn. Layer A (3-1) is a film of CoFe25%, 10 Å in thickness, and layer B (3-2) is a film of CoFe10%, 9.4 Å in thickness. The second pinned layer 5 is a film of CoFe10%, 21 Å in thickness (with magnetization of 3.9 nm·T). The non-magnetic conductive film 6, the free layer 7, and the protective layers are identical with those in Example 1. As shown in FIG. 6, the first pinned layer has the magnetostriction constant which ranges from $5.0 \times 10^{-6}$ to $10.0 \times 10^{-6}$, depending on the ratio (x) of layer A to layer B. Layers A and B have the thickness corresponding to x=0.56, and their magnetostriction constant in this case is 7.2. Being formed from CoFe25%, layer A (adjacent to the antiferromagnetic layer 1) does not cause any appreciable decrease in exchange coupling energy with IrMnCr. It is possible to adjust only the magnetostriction constant by changing the ratio of CoFe10% layer 5 (or layer B). Since the magnetostriction constant of the second pinned layer 5 is $3.0 \times 10^{-6}$, the difference in magnetostriction constants ($\lambda 1 - \lambda 2$) between the pinned layers is $4.2 \times 10^{-6}$ as shown at the right side in FIG. 4. In this case, the pinned layers have the ratio of magnetization reversal which is zero when dM is 0 to 0.2 nm·T, as indicated by the symbol □ in FIG. 2.

As mentioned above, it is possible to adjust as desired the difference in magnetostriction constants between the first and second pinned layers if the first layer is of dual-layer structure and has its magnetostriction constant properly controlled. Thus it is possible to prevent the pinned layer from suffering magnetization reversal due to application of an external magnetic field. Incidentally, although the first pinned layer is composed of two layers according to this example, the same effect as mentioned above can also be produced even when it is composed of more than two layers. In this case, the layers are arranged such that the Fe content therein decreases as they go away from the antiferromagnetic layer. The same effect as above may also be produced by forming the layer such that the Fe content therein varies continuously in the thickness direction. In this case, the layer is formed such that the Fe content therein continuously decreases in going away from the antiferromagnetic layer. Although layer B for the first pinned layer is formed from an alloy of CoFe10% according to Example 2 mentioned above, it is possible to change the alloy's composition for adjustment of the magnetostriction constant.

Example 3

Figure 7:
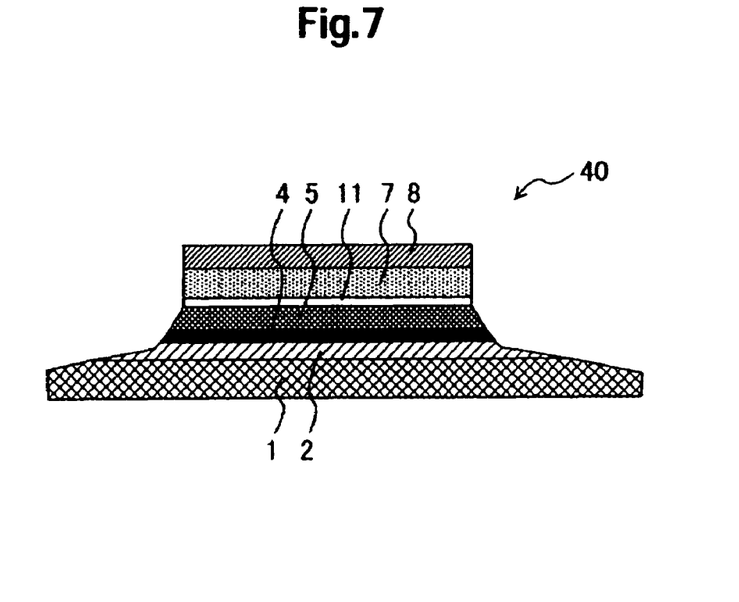
FIG. 7 is a top view (facing the recording medium) of the read element of TMR type pertaining to Example 3.

FIG. 7 is a top view (facing the recording medium) of the read element 40 of the magnetic head (of magnetoresistance effect type) pertaining to Example 3. The read element 40 is composed of the following layers which are stacked one over another.

The antiferromagnetic layer 1 (which is an IrMnCr film, 60 Å in thickness), the first pinned layer 5 (which is a CoFe25% film, 17 Å in thickness), the antiferromagnetic coupling layer 4 (which is a Ru film, 4.5 Å in thickness), the second pinned layer 2 (which is a CoFeB film, 19 Å in thickness), the barrier layer 11 (which is a MgO film, 10 Å in thickness), the free layer 7 (which is a CoFe10% film, 35 Å in thickness), and the protective layer 8 (which is a Ta film, 100 Å in thickness). Incidentally, the antiferromagnetic layer 1 (or the IrMnCr film) may be formed from any antiferromagnetic substance composed mainly of IrMn. The first pinned layer should have a composition represented by $Co_{100-x}Fe_x$ (where $20 \leq x \leq 30$ at %).

Figure 8:
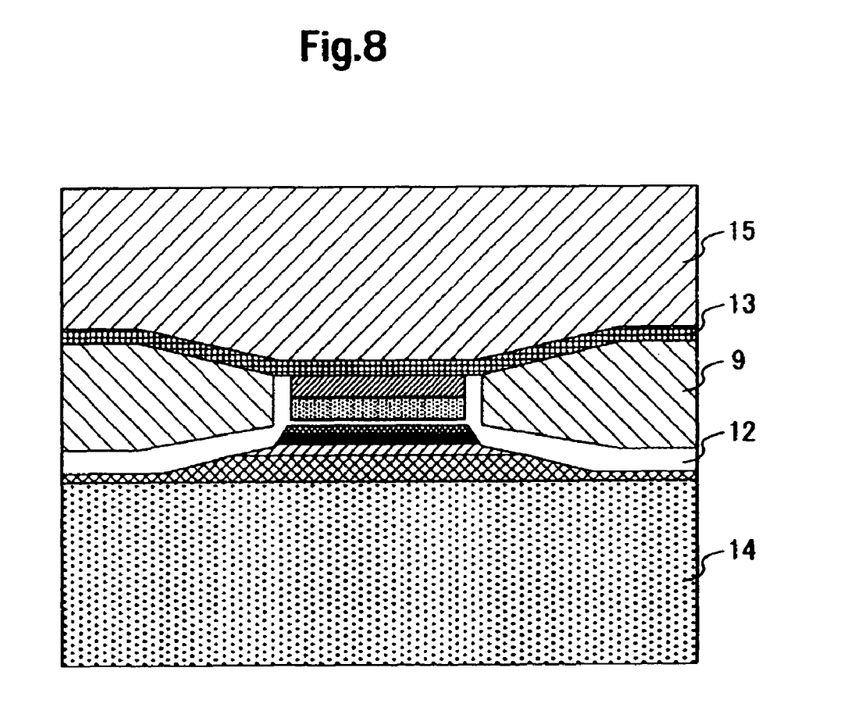
FIG. 8 is a top view (facing the recording medium) of the TMR head pertaining to Example 3.

The read head is prepared by the following process (illustrated in FIG. 8). First, the element structure 40 shown in FIG. 7 is formed on the lower magnetic shield layer 14. The rear of the element (extending into the paper) is formed and then the lateral ends (extending beyond the track width) are removed by etching. The permanent magnet layer 9 (which controls the magnetic domain of the free layer) is formed, with the insulating layer 12 (10 nm thick) placed thereunder. The electrode layer 13 (which is a 10-nm thick Rh film) and the upper magnetic shield layer 15 are formed sequentially. The upper and lower magnetic shield layers 14 and 15 (which function also as the electrodes) permit current to flow in the vertical direction along the surface of the paper.

The second pinned layer 5 (which is a CoFeB film) has a magnetostriction constant of $8.0 \times 10^{-6}$ and the first pinned layer 2 (which is a CoFe25% film) has a magnetostriction constant of $7.0 \times 10^{-6}$. Therefore, the difference in magnetostriction constant between the two pinned layers is sufficiently smaller than $5.0 \times 10^{-6}$. The difference (dM) in the amount of magnetization between the two pinned layers is 0.4 nm·T. The sample thus obtained was tested for the ratio of pinned layers suffering magnetization reversal in the same way as in Example 1. The result was that the ratio was zero, and this result suggests that the pinned layers are stable to external magnetic fields.

The CoFe10% film has a magnetostriction constant of $3.0 \times 10^{-6}$, whereas the CoFeB film has an increased magnetostriction constant of $8.0 \times 10^{-6}$ on account of B added in an amount of 15% to 30%. Therefore, the element constructed as mentioned above offers the advantage of reducing the difference in magnetostriction constant between the first and second pinned layers.

Although the barrier layer in the tunnel magnetoresistive element mentioned above is formed from MgO, it may also be formed from alumina or titania to produce the same effect. Moreover, the first pinned layer of CoFe25% may be replaced by the pinned layer of the dual film structure as in Example 1 to produce the same effect by adjustment of the magnetostriction constant.

What is claimed is:

1. A magnetic head of tunnel magnetoresistance effect type which has between lower and upper magnetic shield layers (both functioning as electrode layers), an antiferromagnetic layer, a pinned layer which has the direction of magnetization pinned by exchange coupling with said antiferromagnetic layer, an insulating layer, and a free layer whose direction of magnetization rotates relatively to external magnetic fields, wherein said antiferromagnetic layer is of an antiferromagnetic substance composed mainly of IrMn, said pinned layer is made up of a first pinned layer of CoFe alloy which is in contact with said antiferromagnetic layer and a second pinned layer of CoFeB alloy which is antiferromagnetically coupled with said first pinned layer, and said first and second pinned layers have the amount of magnetization (represented by M1 and M2, respectively) such that the difference M1−M2 is in the range of $0 \leq M2-M1 \leq 0.5$ (nm·T) and also have the magnetostriction constants (represented by $\lambda 1$ and $\lambda 2$, respectively) such that the difference $|\lambda 1 - \lambda 2|$ is no larger than $5.0 \times 10^{-6}$.

2. The magnetic head of tunnel magnetoresistance effect type as defined in claim 1, wherein the first pinned layer is of $Co_{100-x}Fe_x$ alloy (where $20 \leq x \leq 30$ at %) and the second pinned layer is of CoFeB alloy containing 15 to 30 at % of B.

3. The magnetic head of tunnel magnetoresistance effect type as defined in claim 1, wherein the first pinned layer is made up of layer A of $Co_{100-x}Fe_x$ alloy (where $20 \leq x \leq 30$ at %) which is in contact with the antiferromagnetic layer and layer B of $Co_{100-x}Fe_x$ alloy (where $0 \leq x \leq 10$ at %) which is in contact with an antiferromagnetically coupled layer.

4. The magnetic head of tunnel magnetoresistance effect type as defined in claim 1, wherein the first and second pinned layers are antiferromagnetically coupled with each other through an antiferromagnetically coupled layer of Ru.

5. The magnetic head of tunnel magnetoresistance effect type as defined in claim 1, wherein the antiferromagnetic layer is of IrMnCr.

* * * * *